United States Patent [19]

Talbot

[11] Patent Number: 4,542,584

[45] Date of Patent: Sep. 24, 1985

[54] EGG CRACKING DEVICE

[76] Inventor: Marie L. C. Talbot, Old Pavillion St., Port Louis, Mauritius

[21] Appl. No.: 451,588

[22] Filed: Dec. 20, 1982

[51] Int. Cl.⁴ ............................................. A47J 43/14
[52] U.S. Cl. ................................... 30/120.1; 99/496; 99/568; 99/577
[58] Field of Search .................................. 99/495–500, 99/537, 567, 568, 572, 581, 582, 577, 578; 30/120.1–120.5

[56] References Cited

U.S. PATENT DOCUMENTS

| | | | |
|---|---|---|---|
| 426,281 | 4/1890 | King | 30/120.1 |
| 824,748 | 7/1906 | Schneider | 30/120.1 |
| 2,130,623 | 9/1938 | Hines et al. | 99/496 X |
| 2,476,356 | 7/1949 | Cook | 99/498 |
| 2,729,254 | 1/1956 | McLaughlin | 30/120.1 |

Primary Examiner—Timothy F. Simone
Attorney, Agent, or Firm—Henderson & Sturm

[57] ABSTRACT

The invention discloses an egg cracking device, which includes a pair of complementary egg support container parts. A pair of hingedly connected elongated handle arms are provided, one of each being connected to its egg container part, and being arranged to be moved from a closed position, in which the egg container parts abut against each other, to an open position, in which the egg container parts are moved apart. The device further includes biassing means urging the handle arms into the closed position; and a pair of egg cutter members connected to the egg container parts, and abutting against each other when the egg container parts are in the closed position. The egg cutter members are adapted each to grip a part of a cut egg shell and to keep the egg shell parts apart when the handle arms are pressed against the biassing means for opening the egg container parts.

1 Claim, 8 Drawing Figures

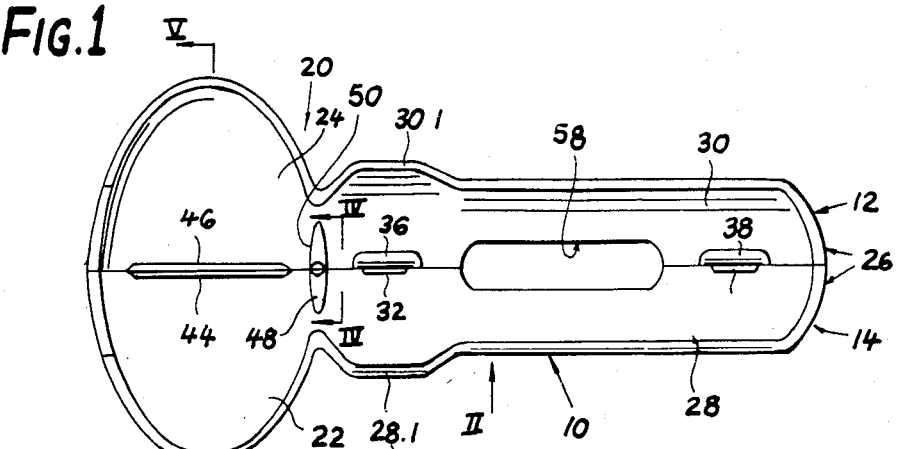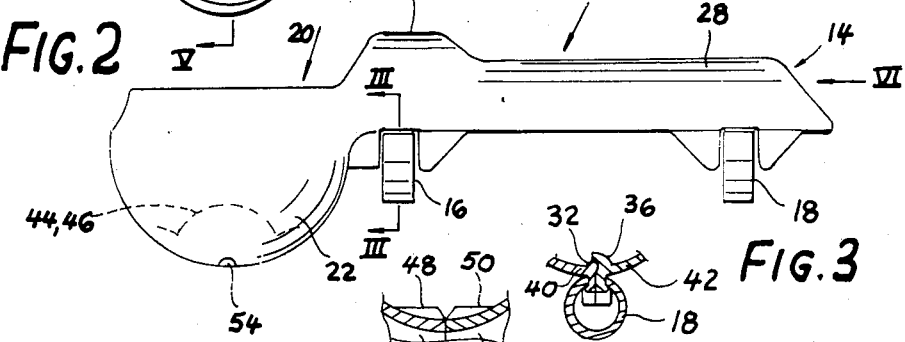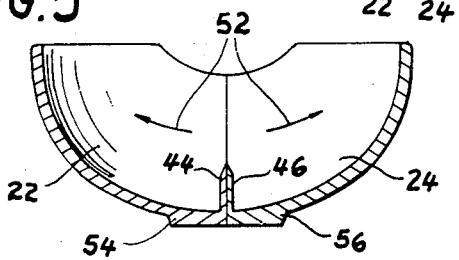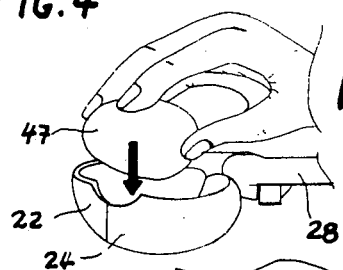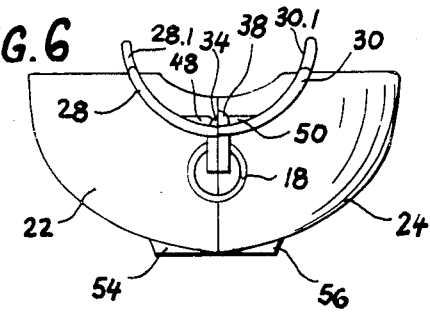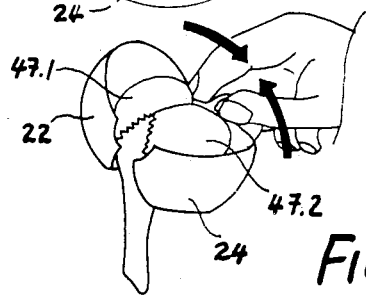

4,542,584

EGG CRACKING DEVICE

BACKGROUND OF INVENTION

1. Field of Invention

The present invention relates to egg cracking devices.

A number of egg cracking devices are known, but these generally are complicated comprising numerous moving parts.

It is an object of the invention to provide a simple but effective egg cracking device including a minimum number of parts.

2. Brief Description of Invention

According to the invention, an egg cracking device includes a pair of complementary egg container parts adapted together to support an egg to be cracked; a pair of hingedly connected elongated handle arms, one of each being connected to its egg container part, the handle arms being arranged to be moved from a closed position, in which the egg container parts abut against each other, to an open position, in which the egg container parts are moved apart for providing a gap between them; biasing means acting on the handle arms for urging them into the closed position; and a pair of egg cutter members, one of each being connected to its egg container part, the egg cutter members abutting against each other when the egg container parts are in the closed position, the egg cutter members being adapted to cut an egg sheel when hit on them and further being adapted each to grip a part of a cut egg shell and to keep the egg shell parts apart when the handle arms are pressed against the biasing means for opening up the egg container parts.

The egg container parts together may be substantially equivalent to at least half an egg.

The egg cracking device may include two halves, each half comprising an egg container part integral with a handle arm.

The handle arms may be hinged at two spaced positions.

The biasing means may include at least one ring spring acting on the pair of handle arms.

DESCRIPTION OF THE DRAWING

The invention will now be described by way of example with reference to the accompanying schematic drawings.

In the drawings there is shown in:

FIG. 1 a plan view of an egg cracking device in accordance with the invention;

FIG. 2 a side view seen along arrow II in FIG. 1;

FIG. 3 a sectional partial view seen along arrows III—III in FIG. 2 showing details of the hinge and spring;

FIG. 4 a sectional partial view seen along arrows IV—IV in FIG. 1 showing the stopping arrangement;

FIG. 5 a sectional view seen along arrows V—V in FIG. 1 showing the egg container parts in section;

FIG. 6 an end view of the handle seen along arrow VI in FIG. 2;

FIG. 7 schematically how an egg is hit into the container parts of the egg cracking device; and FIG. 8 the egg cracking device being opened for allowing the contents to drop out of a cracked egg.

The egg cracking device 10 comprises only four elements namely (a) a first part 12 being a hollow egg container part integral with a handle arm;

(b) a second part 14 being a hollow egg container part integral with a a handle arm and being complementary to the part 12.

(c) a first split ring spring 16; and (d) a second split ring spring 18.

The egg container part 20 comprises a pair of complementary hollow egg container parts 22, 24. The handle 26 comprises a pair of complementary arcuate elongated arms 28, 30, respectively being integral with the hollow egg container parts 22, 24.

The arm 28 has two cylindrical hinge parts 32, 34 engaging respectively in complementary cylindrical recesses provided in cylindrical hinge parts 36, 38 provided on the arm 30. Below these hinge parts 36, 38 recesses 40, 42 are provided for locating the ring spring 16. The same applies to ring spring 18.

In the egg container parts 22, 24 the egg cracking means is provided as a pair of abutting flat arcuate egg cutters 44, 46 extending along the floor of the egg container parts.

In use, as shown in FIG. 7, an egg 47 to be cracked is hit on to the cutters 44, 46. Thereby the egg shell is cracked so that the cutters 44, 46 penetrate into the egg shell. Now, as shown in FIG. 8, the handle parts 28, 30 are pressed together at the raised parts 28.1, 30.1 (refer also to FIGS. 1, 2). Thereby these parts swing outwardly about the hinge cylinders 32, 34, until the stop parts 48, 50 abut together. This operation simultaneously causes the egg container parts 22, 24 to swing outwardly as shown by arrows 52 in FIG. 5. This results in the egg shell halves 47.1, 47.2 (gripped by the cutters 44, 46) to be pulled apart so that the eggs contents falls out.

The straight parts 54, 46 ensure that the egg cracker 10 will lie still on a flat surface, e.g. a table All of the parts of the egg cracking device 10 may be made of metal or of plastic material, e.g. by injection moulding.

Centrally, the hinge parts 28.3 of the handle 26 have cut-outs to define an opening 58 for suspending the device 10 from a support hook.

I claim:

1. An egg cracking and emptying apparatus comprising:

chamber means for forming an egg receiving chamber, said chamber means being formed of a first concave member, forming half of said chamber means, and a second concave member, forming the other half of said chamber means, each of said first and second members having a top outermost portion and a bottom portion;

means for selectively permitting pivoting of said first member with respect to the second member along an axis passing through an egg disposed in said chamber means between a first relative position wherein the bottom portions of said first and second members are in abutment with each other and the outermost top portions of said first and second members are a predetermined distance apart, and a second relative position wherein the bottom portions of said first and second members are spaced apart from each other and the outermost top portions of said first and second members are closer together than said predetermined distance;

means for biasing said first and second members into abutment with each other to form said chamber;

a first egg shell piercing means, rigidly connected to the bottom portion of said first member and extending upwardly therefrom for piercing an egg shell;

a second egg shell piercing means rigidly connected to the bottom portion of said member and extending upwardly therefrom for piercing an egg shell, said first and second egg shell piercing means being substantially in abutment with each other in the first relative position of said first and second members whereby when an egg is placed into said chamber means, said first and second egg shell piercing means will extend into a bottom, central portion of said egg; and means for selectively relatively pivoting said first and second members of said chamber means from the first to the second relative position thereof whereby the egg shell will be pulled in half and the liquid portion of the egg will, by gravity, drop down between the bottom portions of said first and second members.

* * * * *